United States Patent
Ekshinge et al.

(10) Patent No.: US 10,605,520 B1
(45) Date of Patent: Mar. 31, 2020

(54) VACUUM INSULATION ASSEMBLY FOR AN APPLIANCE

(71) Applicant: WHIRLPOOL CORPORATION, Benton Harbor, MI (US)

(72) Inventors: Sunil S. Ekshinge, Pune (IN); Rafael D. Nunes, St. Joseph, MI (US); Sanjesh Kumar Pathak, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/362,963

(22) Filed: Mar. 25, 2019

(51) Int. Cl.
*F25D 23/06* (2006.01)
*F25D 23/08* (2006.01)

(52) U.S. Cl.
CPC ......... *F25D 23/066* (2013.01); *F25D 23/085* (2013.01); *F25D 2201/14* (2013.01)

(58) Field of Classification Search
CPC .... F25D 23/066; F25D 23/068; F25D 23/085; F25D 2201/14; F17C 3/02
See application file for complete search history.

(56) References Cited

U.S. PATENT DOCUMENTS

| | | | |
|---|---|---|---|
| 2,164,143 A | 6/1939 | Munters | |
| 5,512,345 A * | 4/1996 | Tsutsumi | F25D 23/063 220/592.27 |
| 6,109,712 A | 8/2000 | Haworth et al. | |
| 6,336,693 B2 | 1/2002 | Nishimoto | |
| 6,656,411 B1 * | 12/2003 | McClure | B29C 70/547 264/257 |
| 8,678,530 B2 * | 3/2014 | Wilson | B29C 44/385 137/561 A |
| 8,944,541 B2 * | 2/2015 | Allard | F25D 23/062 312/406 |
| 9,132,592 B2 * | 9/2015 | Tobbe | F25D 23/064 |
| 9,170,046 B2 | 10/2015 | Jung et al. | |
| 2011/0061417 A1 * | 3/2011 | Cullen | A47F 3/0439 62/298 |
| 2013/0111942 A1 * | 5/2013 | Jung | F25D 23/061 62/440 |
| 2017/0159991 A1 * | 6/2017 | Cho | F25D 17/062 |
| 2019/0128592 A1 * | 5/2019 | Westlake | F25D 23/062 |
| 2019/0285336 A1 * | 9/2019 | Naik | F16L 59/065 |

FOREIGN PATENT DOCUMENTS

| | | | | |
|---|---|---|---|---|
| EP | 0757136 A1 * | 2/1997 | ............ | E04B 1/803 |
| JP | H01318880 A | 12/1989 | | |
| WO | WO-2009019268 A2 * | 2/2009 | ........... | F25D 23/068 |

* cited by examiner

*Primary Examiner* — Daniel J Rohrhoff
(74) *Attorney, Agent, or Firm* — Price Heneveld LLP (57) ABSTRACT

A vacuum insulation assembly is provided. The vacuum insulation assembly includes a panel assembly. The panel assembly includes a front panel and a rear panel. The front panel and the rear panel define a cavity. An aperture is defined by the rear panel. A vacuum port is positioned within the aperture and is selectively couplable with a vacuum device. A plurality of clips are operably coupled with an inner surface of the rear panel. Each of the plurality of clips defines a channel. Tubing is positioned within the channel of each of the plurality of clips. The tubing has a first end and a second end. The first and second ends are coupled with the vacuum port.

17 Claims, 13 Drawing Sheets

VACUUM INSULATION ASSEMBLY FOR AN APPLIANCE

FIELD

The present device generally relates to a vacuum insulation assembly, and more specifically to a vacuum insulation assembly for an appliance.

BACKGROUND

Insulation is commonly disposed within the walls of refrigerator appliances. Vacuum insulation assemblies may improve insulation properties for refrigerator appliances.

SUMMARY

In at least one aspect, a vacuum insulation assembly may be provided. The vacuum insulation assembly may include a panel assembly. The panel assembly may include a front panel and a rear panel. The front panel and the rear panel may define a cavity. An aperture may be defined by the rear panel. A vacuum port may be positioned within the aperture and may be selectively couplable with a vacuum device. A plurality of clips may be operably coupled with an inner surface of the rear panel. Each of the plurality of clips may define a channel. Tubing may be positioned within the channel of each of the plurality of clips. The tubing may have a first end and a second end. The first and second ends may be coupled with the vacuum port.

In at least another aspect, a vacuum insulation assembly may be provided. The vacuum insulation assembly may include a front panel operably coupled with a rear panel. An aperture may be defined by one of the front panel and the rear panel. A vacuum port may be positioned within the aperture. A plurality of clips may be operably coupled with an inner surface of the rear panel. Tubing may be coupled with the plurality of clips. A first end and a second end of the tubing may be coupled with the vacuum port.

In at least another aspect, a method for assembling a vacuum insulation assembly may be provided. The method may include a step of positioning a guide flush with an inner surface of a rear panel. The guide may define a plurality of spaces oriented in a predetermined pattern. The method may include a further step of coupling a plurality of clips with the inner surface of the rear panel. The plurality of clips may be positioned within the plurality of spaces of the guide. Another step of separating the guide from the rear panel may be included in the method. The method may also include a step of positioning a vacuum port within an aperture defined by the rear panel. Another step of the method may include coupling permeable tubing with the plurality of clips. The method may further include a step of coupling first and second ends of the permeable tubing with the vacuum port.

These and other features, advantages, and objects of the present device will be further understood and appreciated by those skilled in the art upon studying the following specification, claims, and appended drawings.

DETAILED DESCRIPTION OF EMBODIMENTS

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vacuum insulation assembly for use within a refrigerator appliance. The vacuum insulation assembly may include a front panel and a rear panel configured to define a sealed cavity. A plurality of clips may be coupled with the rear panel and may be configured to extend from the rear panel into the cavity. Tubing may be coupled with the plurality of clips to couple the tubing with the rear panel. The tubing may be porous and may include ends coupled with a vacuum port extending through an aperture defined by one of the rear panel and the front panel. The vacuum port may be coupled with a vacuum device or a port cover. When the vacuum device is coupled with the vacuum port, the vacuum device may be used to remove air from the sealed cavity. The tubing allows air to be removed from the entirety of the cavity more efficiently as compared to when the suction from the vacuum device is only applied at the port. The porous material of the tubing distributes the suction throughout the cavity with the arrangement of the tubing in a predetermined pattern (e.g., a serpentine pattern).

Referring to FIGS. 1-15, reference numeral 10 generally designates a vacuum insulation assembly. The vacuum insulation assembly 10 may include a panel assembly 14. The panel assembly 14 may include a front panel 18 and a rear panel 20. The front panel 18 and the rear panel 20 may define a cavity 24. An aperture 28 may be defined by the rear panel 20. A vacuum port 32 may be positioned within the aperture 28 and may be selectively couplable with a vacuum device 36. A plurality of clips 40 may be operably coupled with an inner surface 44 of the rear panel 20. Each of the plurality of clips 40 may define a channel 48. Tubing 50 may be positioned within the channel 48 of each of the plurality of clips 40. The tubing 50 may have a first end 52 and a second end 54. The first and second ends 52, 54 may be coupled with the vacuum port 32.

Figure 1:
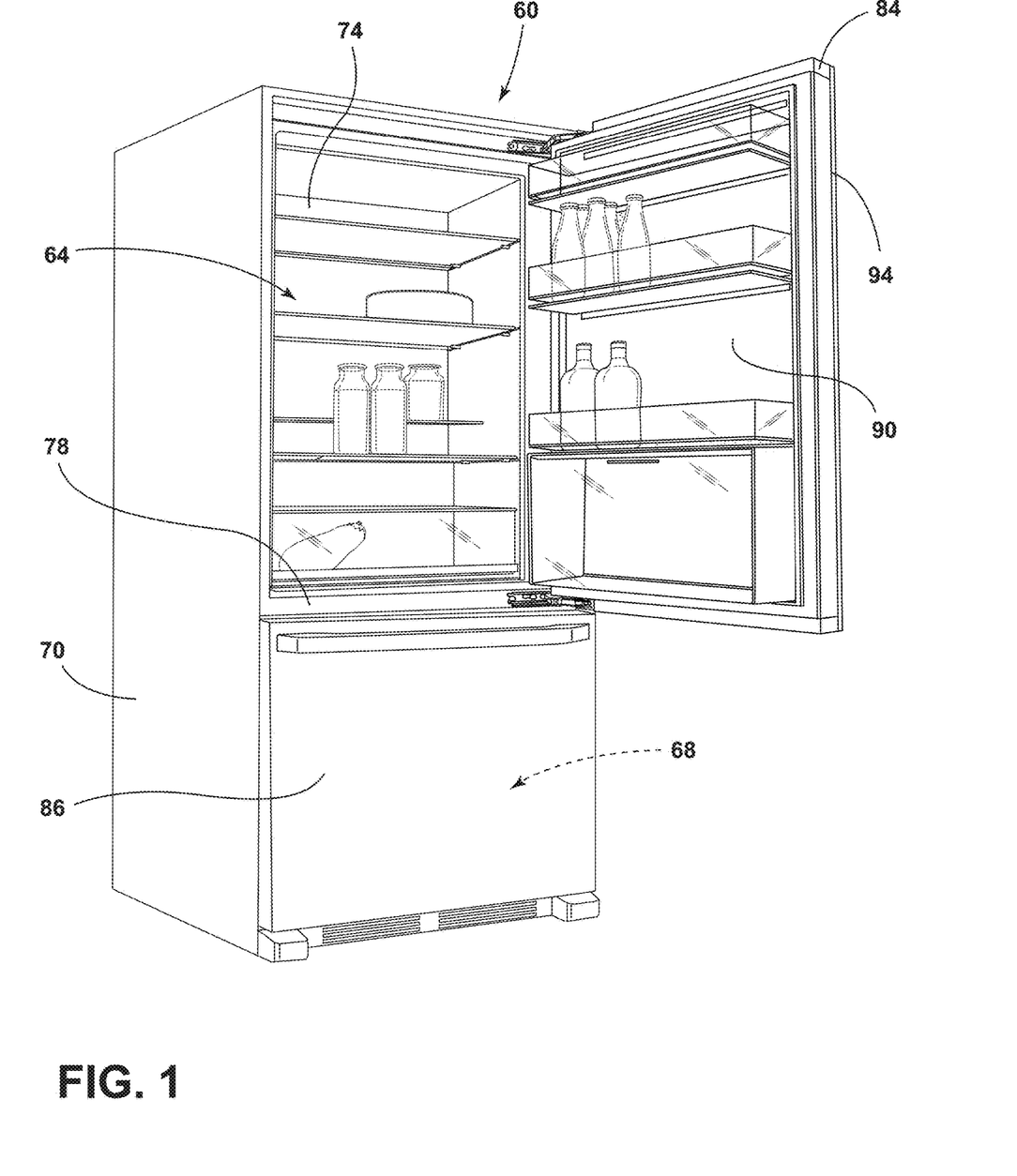
FIG. 1 is a side perspective view of a refrigerator appliance having a door, according to various examples.

Referring again to FIG. 1, a refrigerator appliance 60 is shown having a refrigerator compartment 64 configured to refrigerate consumables and a freezer compartment 68 configured to freeze consumables during normal use. In some instances, the refrigerator appliance 60 may have a cabinet 70 and a liner 74 within the cabinet 70 to define the refrigerator compartment 64 and the freezer compartment 68. A mullion 78 may separate the refrigerator compartment 64 and the freezer compartment 68. FIG. 1 generally shows a refrigerator of the bottom-mount type, but it is understood that this disclosure could apply to any type of refrigerator, such as a side-by-side, two-door bottom-mount, or a top-mount type refrigeration unit.

The refrigerator appliance 60 may have one or more door assemblies 84, 86 that provide selective access to the interior volume of the refrigerator appliance 60 where consumables may be stored. As shown, the refrigerator compartment door assembly 84 selectively closes the refrigerator compartment 64. The freezer door assembly 86 may be a sliding door assembly and may selectively close the freezer compartment 68. It is appreciated that the refrigerator compartment 64 may have a single door assembly 84 or a pair of door assemblies 84. It is also appreciated that the freezer compartment 68 may have a hinged door assembly rather than a sliding assembly, as shown.

Figure 2:
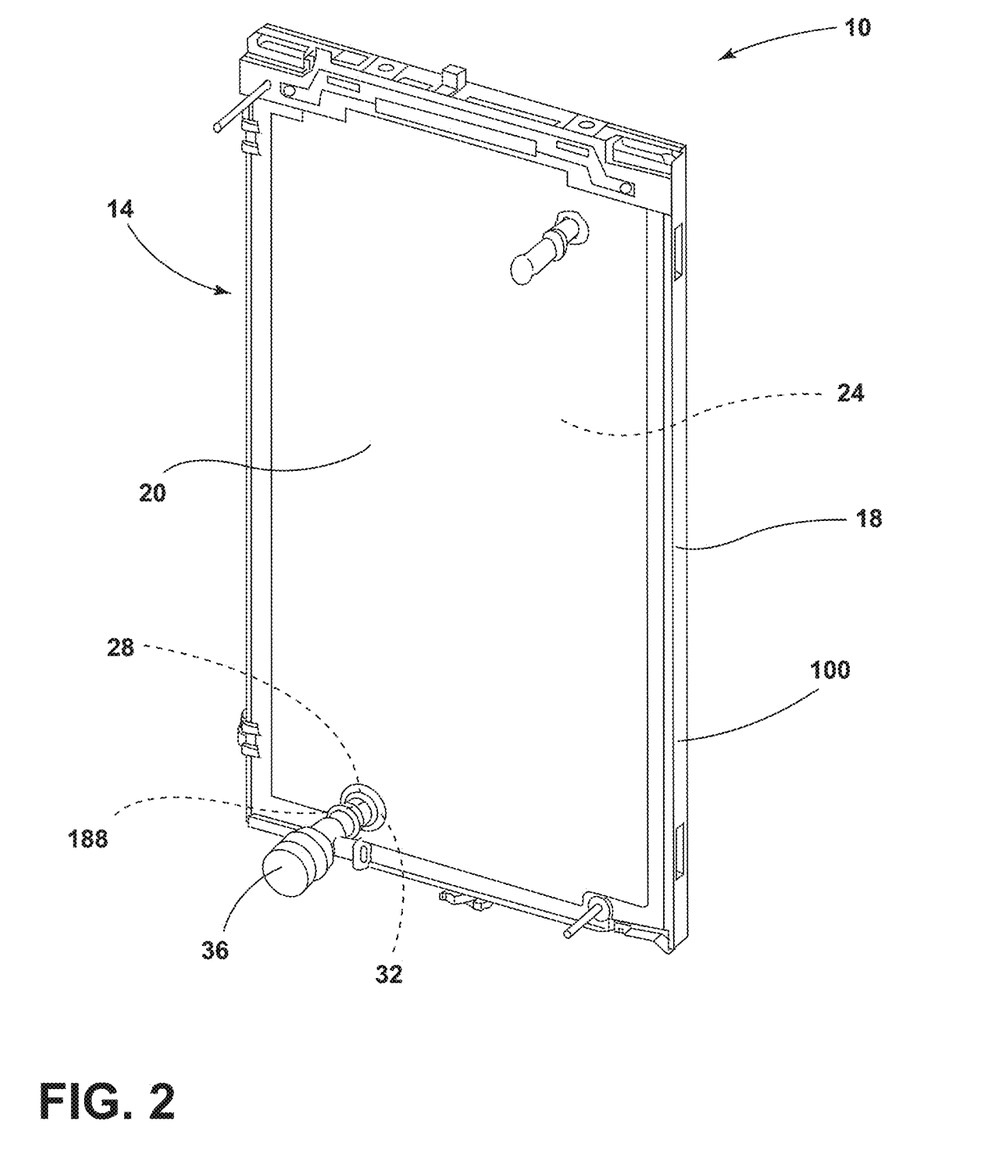
FIG. 2 is a rear perspective view of a panel assembly for a refrigerator door of FIG. 1 including a vacuum device coupled with a vacuum port, according to various examples.

Referring now to FIGS. 1 and 2, the vacuum insulation assembly 10 for the refrigerator compartment door assembly 84 is shown including the panel assembly 14. The panel assembly 14 may include the front panel 18 operably coupled with the rear panel 20 to define the cavity 24. According to various examples, the panel assembly 14 may be positioned within the refrigerator compartment door assembly 84. An inner door liner 90 may be positioned over one of the front panel 18 and the rear panel 20. Similarly, an outer panel 94 of the refrigerator compartment door assembly 84 may be positioned over one of the front panel 18 and the rear panel 20. In other examples, the panel assembly 14 may be integrally formed with the refrigerator compartment door assembly 84. The front panel 18 may be defined by a portion of the inner door liner 90 of the refrigerator compartment door assembly 84. Similarly, the outer panel 94 of the refrigerator compartment door assembly 84 may define the rear panel 20 of the panel assembly 14.

Figure 2A:
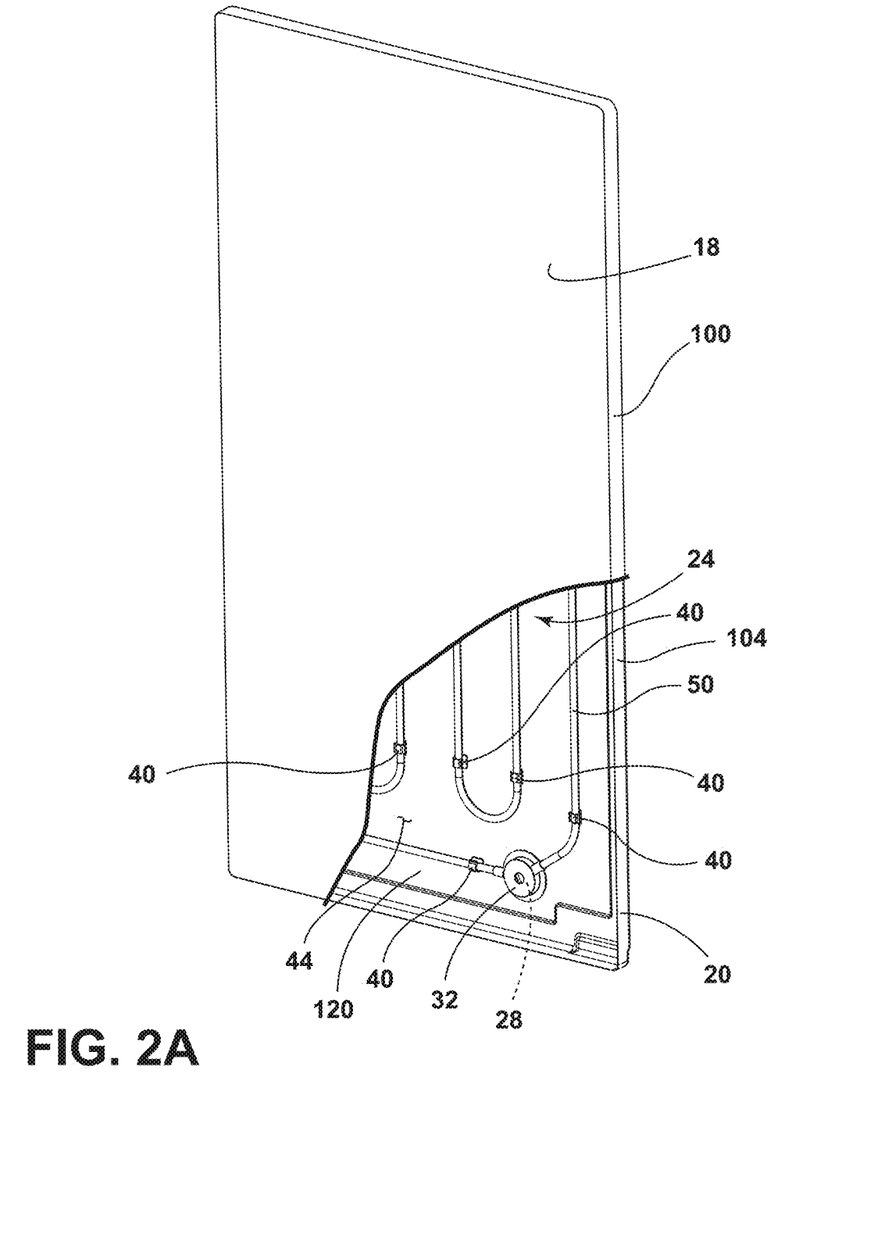
FIG. 2A is a front perspective view of the panel assembly of FIG. 2 with a partial cutaway.

Referring now to FIGS. 2 and 2A, the front panel 18 may include a first perimeter wall 100 extending along at least part of the perimeter of the front panel 18. The rear panel 20 may include a second perimeter wall 104 extending along the perimeter of the rear panel 20. The first perimeter wall 100 may be sized to receive the second perimeter wall 104 and the rear panel 20 when the front panel 18 is coupled to the rear panel 20. The first and second perimeter walls 100, 104 may be aligned, such that the front panel 18 is oriented parallel with the rear panel 20. When the front panel 18 is coupled to the rear panel 20, the first and second perimeter walls 100, 104 are coupled to seal the cavity 24.

Figure 3:
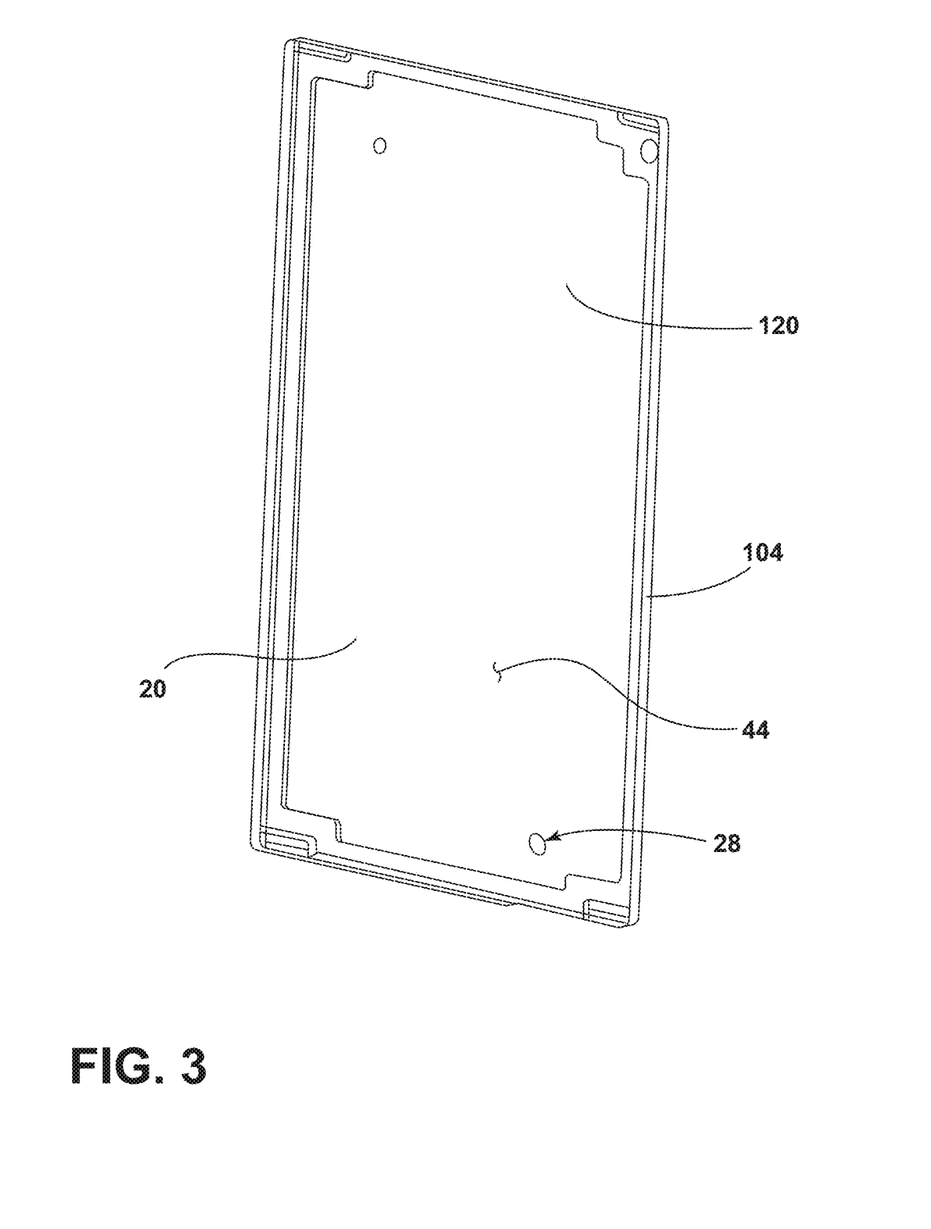
FIG. 3 is a front perspective view of a rear panel of the door of FIG. 1.

Referring now to FIGS. 2A and 3, the rear panel 20 includes a central portion 120 including an outer surface 122 (FIG. 8) and the inner surface 44. The inner surface 44 of the rear panel 20 may be positioned toward the front panel 18 when the rear panel 20 is coupled with the front panel 18. The central portion 120 of the rear panel 20 may define the aperture 28 configured to receive the vacuum port 32. In various examples, the aperture 28 may be defined by the front panel 18. The aperture 28 may be positioned on any portion of the selected panel 18, 20 without departing from the scope of the present disclosure.

Referring now to FIG. 2A, the panel assembly 14 is shown assembled with the cavity 24 defined by the front panel 18 and the rear panel 20. The front and rear panels 18, 20 may be coupled to seal the cavity 24. The plurality of clips 40 may be coupled to the inner surface 44 of the rear panel 20. Each of the plurality of clips 40 may be configured to extend from the inner surface 44 of the rear panel 20 and into the cavity 24. The tubing 50 may be positioned within the plurality of clips 40 and may be oriented in a predetermined pattern. The vacuum port 32 may be positioned within the aperture 28 defined by the rear panel 20. The tubing 50 may be coupled with the vacuum port 32 and may be configured to remove air when the vacuum device 36 (FIG. 2) is coupled with the vacuum port 32 and suction is applied.

Figure 4:
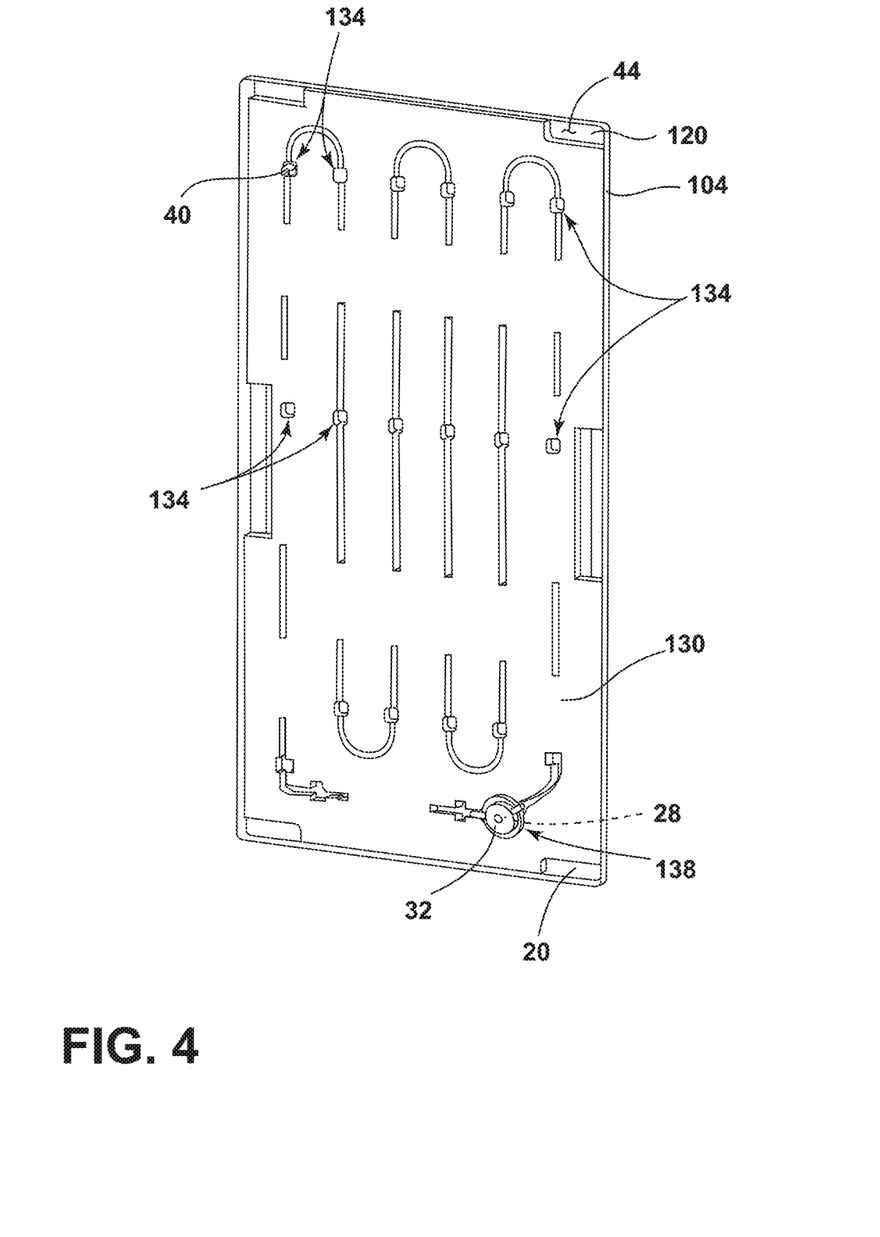
FIG. 4 is a front perspective view of a guide positioned on the rear panel of FIG. 3.
Figure 5:
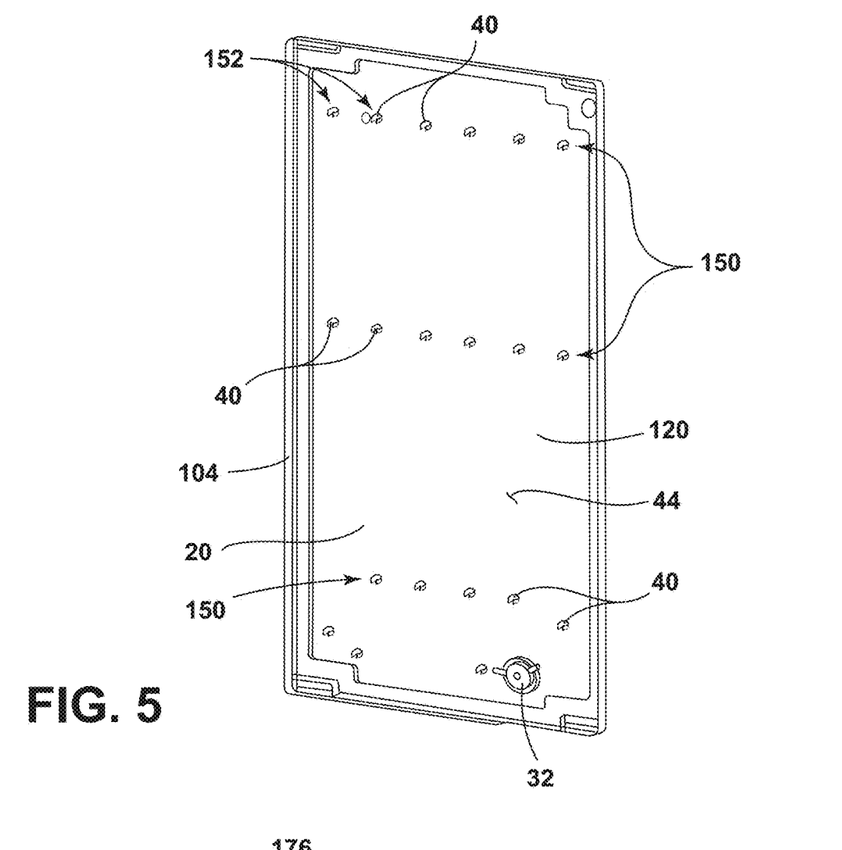
FIG. 5 is a front perspective view of the rear panel of FIG. 3 including a plurality of clips and a vacuum port.

Referring to FIGS. 4-9, a guide 130 may be configured to position the plurality of clips 40 in a predetermined pattern (FIG. 5). The guide 130 may be positioned flush with the inner surface 44 of the rear panel 20. A plurality of spaces 134 may be defined by the guide 130. Each of the plurality of spaces 134 may be configured to receive one of the plurality of clips 40. The guide 130 may further define an opening 138. The opening 138 may be aligned with the aperture 28 of the rear panel 20 when the guide 130 is positioned flush with the inner surface 44 of the rear panel 20. The opening 138 may guide the vacuum port 32 into engagement with the aperture 28 of the rear panel 20. The guide 130 is configured to be removed when the plurality of clips 40 is coupled with the inner surface 44 of the rear panel 20 and the vacuum port 32 is positioned within the aperture 28 of the rear panel 20.

Figure 6:
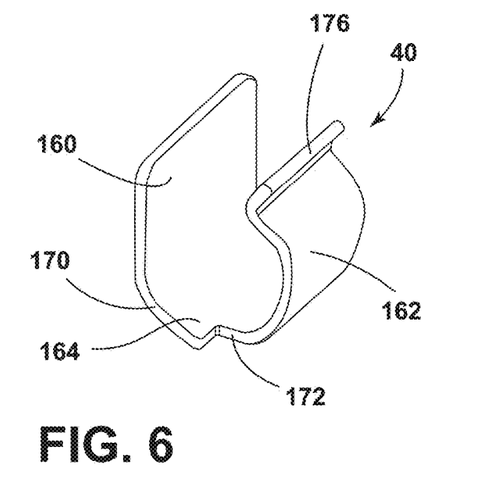
FIG. 6 is a side perspective view of one of the plurality of clips of FIG. 5.

Referring now to FIGS. 4-6, each of the plurality of clips 40 may be coupled with the inner surface 44 of the rear panel 20. According to various examples, each of the plurality of clips 40 may be coupled with the inner surface 44 of the rear panel 20 using adhesive. In other examples, the plurality of clips 40 may be coupled with the rear panel 20 using fasteners, welding, or snap fitting. In still other examples, the plurality of clips 40 may be integrally formed with the rear panel 20.

As determined by the guide 130 (FIG. 4), the plurality of clips 40 may be positioned in a predetermined pattern along the inner surface 44 of the rear panel 20. For example, as shown in FIG. 5, the plurality of clips 40 may be arranged in a plurality of rows 150 spaced apart into a plurality of columns 152. The pattern may further include a portion of the plurality of clips 40 positioned proximate the vacuum port 32. The pattern of the guide 130 may be selected to provide a serpentine pattern for the tubing 50 when the tubing 50 is coupled with the plurality of clips 40 (see FIG. 9). The pattern may also be selected to provide any other pattern that guides the first and second ends 52, 54 of the tubing 50 to couple with the vacuum port 32 of the inner surface 44 of the rear panel 20.

Referring now to FIGS. 5 and 6, each of the plurality of clips 40 may include a substantially linear arm 160 and a substantially arcuate arm 162 extending from a base 164. The arms 160, 162 of each of the plurality of clips 40 may be positioned to extend away from the inner surface 44 of the rear panel 20. The substantially linear arm 160 may extend perpendicularly from a first side 170 of the base 164 of the respective clip 40. In various examples, the first side 170 of the base 164 may be curved away from the inner surface 44 of the rear panel 20. The substantially arcuate arm 162 may extend from a second side 172 of the base 164. The second side 172 of the base 164 may be opposite the first side 170 of the base 164. The substantially arcuate arm 162 may curve toward the substantially linear arm 160 to define the channel 48 of the respective clip 40. The substantially arcuate arm 162 and the substantially linear arm 160 may define the channel 48 to have a circular cross-section, an oval cross-section, a hemispherical cross-section, or any other cross-section configured to complement the cross-section of the tubing 50. The substantially arcuate arm 162 may include an angled edge 176 configured to facilitate coupling the tubing 50 with the respective clip 40.

Figure 7:
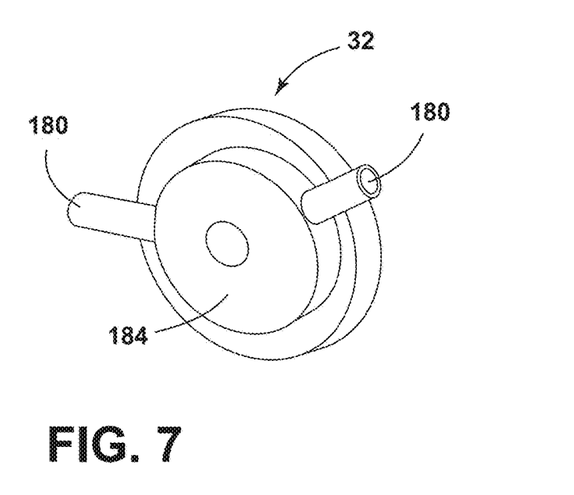
FIG. 7 is a side perspective view of the vacuum port of FIG. 5.
Figure 8:
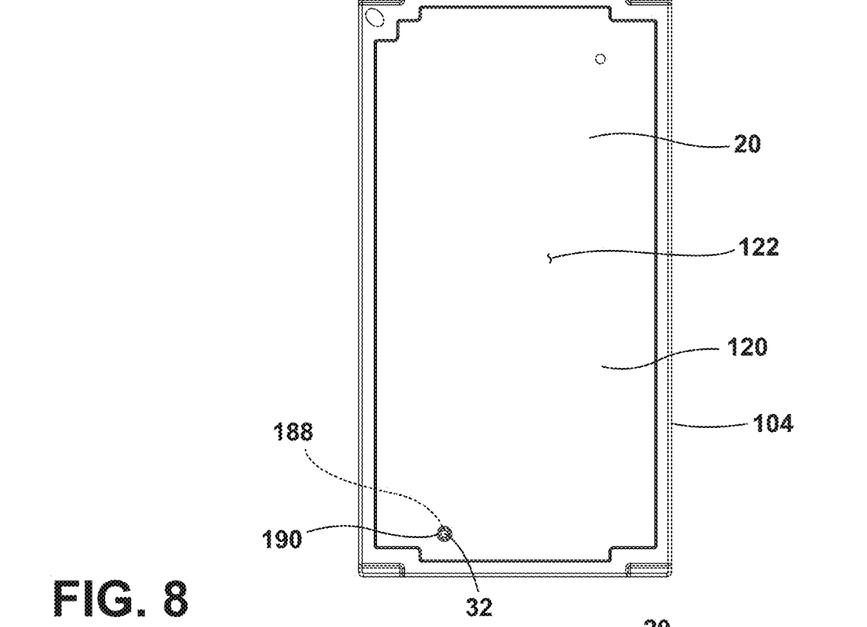
FIG. 8 is a rear elevational view of the panel assembly of FIG. 2 including a cover coupled with the vacuum port.

Referring now to FIGS. 5 and 7, the vacuum port 32 may be positioned within the aperture 28 of the rear panel 20 and may be oriented using the opening 138 of the guide 130 (FIG. 5). The vacuum port 32 may include at least one inlet 180 extending outward from a body 184. The inlet 180 may be configured to be coupled with one of the first and second ends 52, 54 of the tubing 50. As shown in FIGS. 2 and 8, the vacuum port 32 may include an outlet 188 (FIGS. 2 and 8) defined by the body 184 of the vacuum port 32. The outlet 188 may be configured to be selectively coupled with one of the vacuum device 36 (FIG. 2) and a port cover 190 (FIG. 8).

Figure 9:
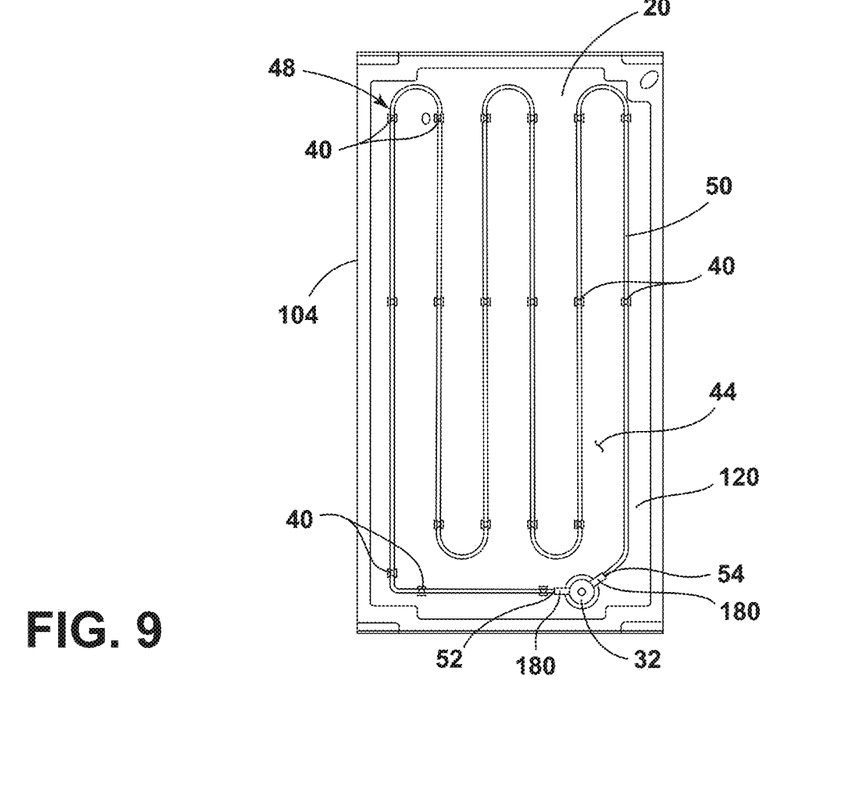
FIG. 9 is a front elevational view of the rear panel of FIG. 3 including a plurality of clips, a vacuum port, and tubing.

As discussed elsewhere herein and shown in FIG. 9, the tubing 50 may be positioned within the channel 48 of each of the plurality of clips 40. The tubing 50 may have a generally circular cross-section across at least a portion of the tubing 50 and may be positioned within the channel 48 of each of the plurality of clips 40. The tubing 50 may be made of porous material and may be permeable. The tubing 50 may include a first end 52 and a second end 54, as discussed previously. The first and second ends 52, 54 may be coupled with inlets 180 of the vacuum port 32, creating a continuous loop of tubing. As discussed above, the plurality of clips 40 may be positioned to orient the tubing 50 in any pattern, including, for example, the serpentine pattern shown, a pattern extending about the edges of the panel 20, a pattern extending through the center of and about the edges of the panel 20, or any other pattern. It is further contemplated that other devices for securing the tubing 50 in the pattern may be used, such as, for example, directly coupling the tubing 50 with the panel 20.

Figure 10:
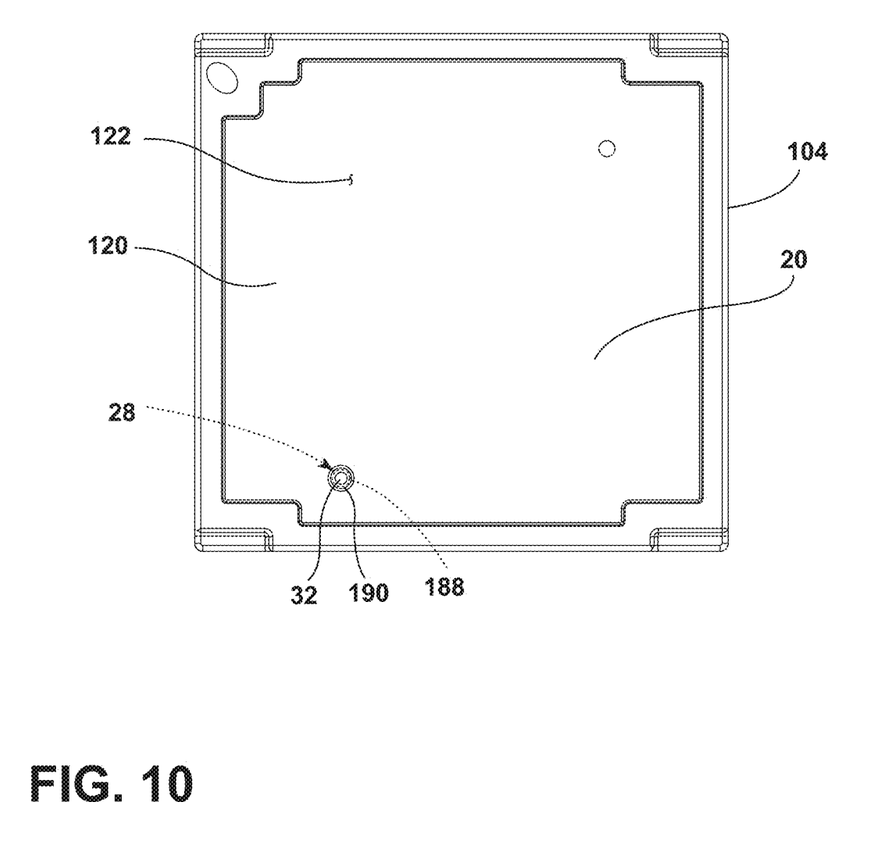
FIG. 10 is a rear elevational view of a panel assembly for a freezer door of FIG. 1, according to various examples.
Figure 11:
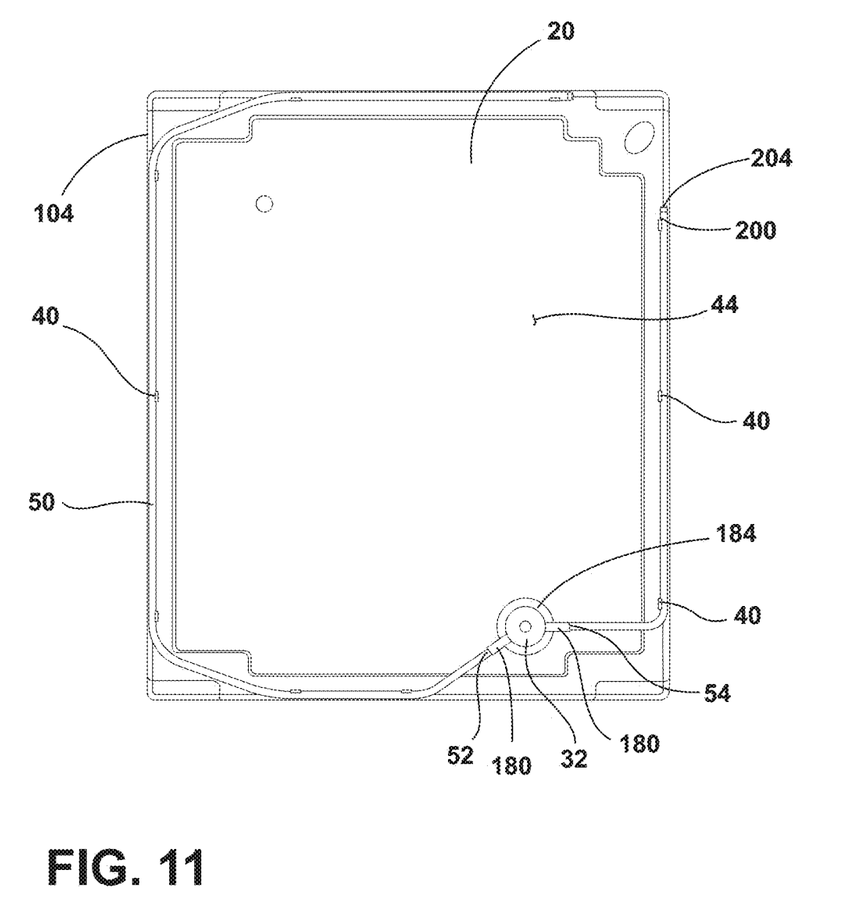
FIG. 11 is a front elevational view of a rear panel of the panel assembly of FIG. 10 including a vacuum port, a plurality of clips, and tubing.

Referring now to FIGS. 1, 10, and 11, the panel assembly 14 of the vacuum insulation assembly 10 may be positioned within the freezer door assembly 86. Where the panel assembly 14 is positioned within the freezer door assembly 86, the plurality of clips 40 may be arranged in a second predetermined pattern. The second predetermined pattern may include positioning the plurality of clips 40 along a perimeter of the rear panel 20. The positioning of the plurality of clips 40 and tubing 50 along the perimeter of the rear panel 20 facilitates the use of the vacuum insulation assembly 10 with portions of the appliance 60 that have lower temperatures (e.g., the freezer compartment 68). However, it is contemplated that the plurality of clips 40 may be positioned to orient the tubing 50 in any pattern, including, for example, the pattern extending about the edges of the panel 20 as shown, a serpentine pattern, a pattern extending through the center of and about the edges of the panel 20, or any other pattern. It is further contemplated that other devices for securing the tubing 50 in the pattern may be used, such as, for example, directly coupling the tubing 50 with the panel 20.

According to various examples, the first and second ends 52, 54 of the tubing 50 may be coupled with inlets 180 of the vacuum port 32 to form a continuous loop of tubing. In other examples, the first and second ends 52, 54 of the tubing 50 may be coupled with the inlets 180 of the vacuum port 32. At least one terminal end 200 of the tubing 50 may extend along the inner surface 44 of the rear panel 20 as guided by the plurality of clips 40. The terminal end 200 may be positioned away from the vacuum port 32. The terminal end 200 may be open and disconnected from the rest of the tubing 50 and the vacuum port 32. In still other examples, each of the terminal ends 200 of the tubing 50 may be coupled with a cap 204.

Referring now to FIGS. 1 and 12-14, the panel assembly 14 of the vacuum insulation assembly 10 may be positioned within the cabinet 70 of the appliance 60. As discussed elsewhere herein with respect to the vacuum insulation assembly 10 being positioned within one of the refrigerator compartment door assembly 84 and the freezer door assembly 86, the panel assembly 14 may be integrally formed with the cabinet 70 of the appliance 60. For example, the cabinet 70 may define the rear panel 20 while the liner 74 defines the front panel 18. In other examples, the vacuum insulation assembly 10 may be positioned between the cabinet 70 and the liner 74. When the panel assembly 14 of the vacuum insulation assembly 10 is positioned within the cabinet 70 of the appliance 60, the rear panel 20 may include first and second side portions 210, 212 extending perpendicularly from a base portion 216. The first and second side portions 210, 212 may be configured to complement the shape of the cabinet 70 of the appliance 60.

Figure 12:
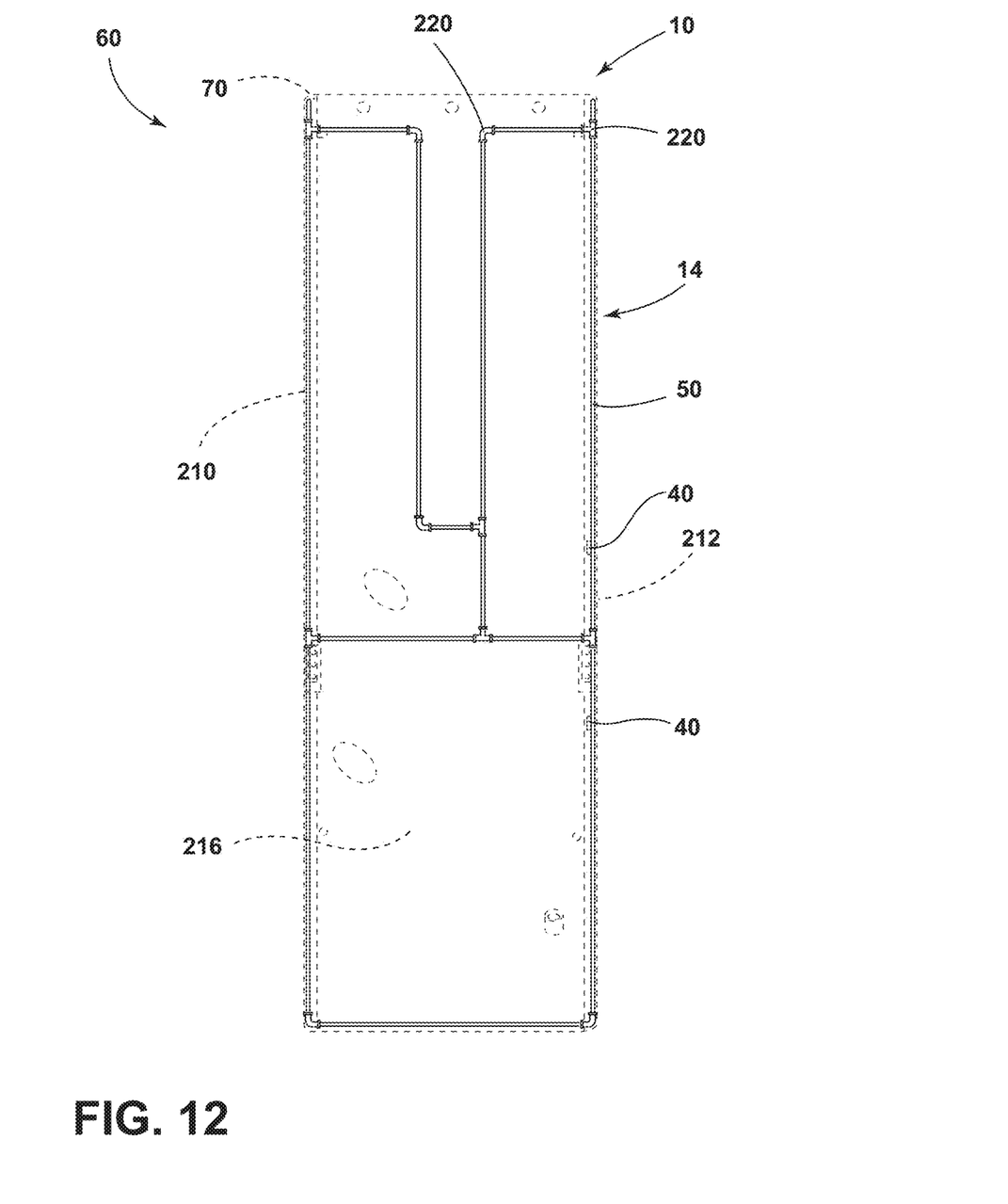
FIG. 12 is a rear elevational view of an appliance shown in phantom including a plurality of clips and tubing, according to various examples.
Figure 13:
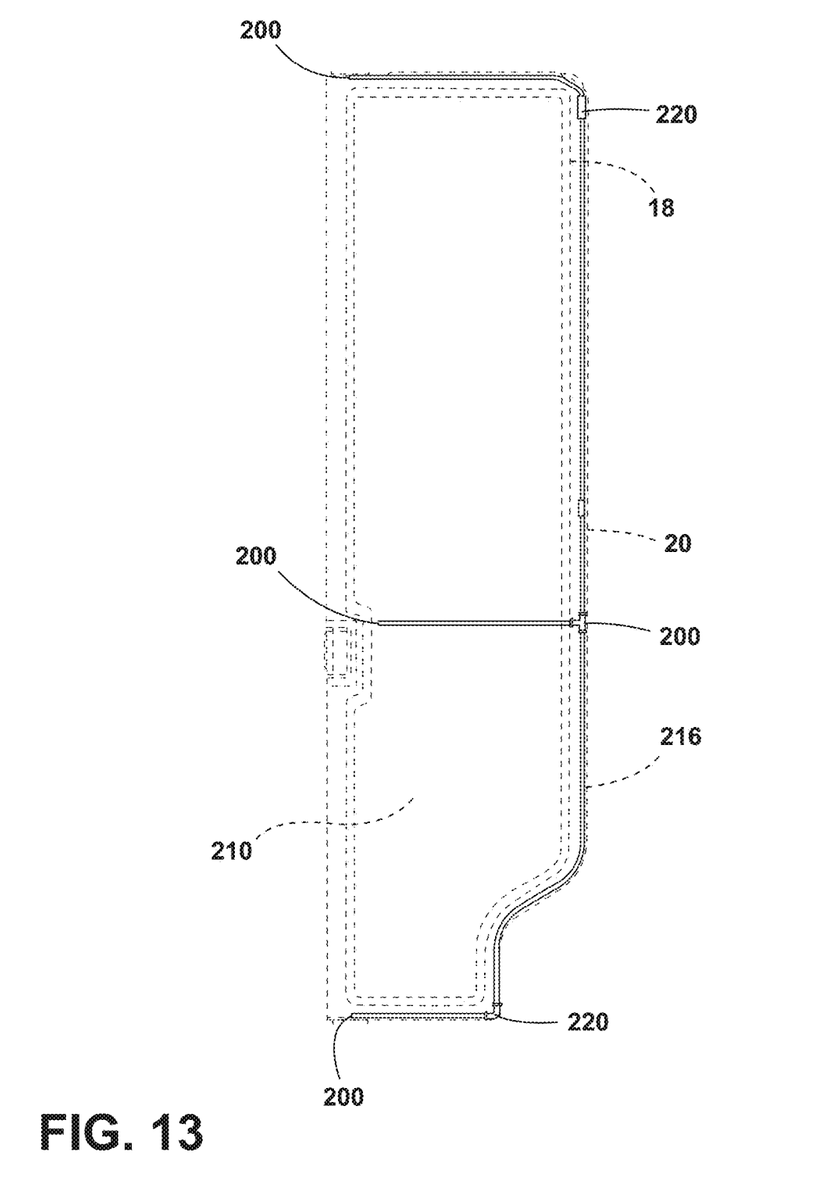
FIG. 13 is a side elevational view of the appliance and tubing of FIG. 12.
Figure 14:
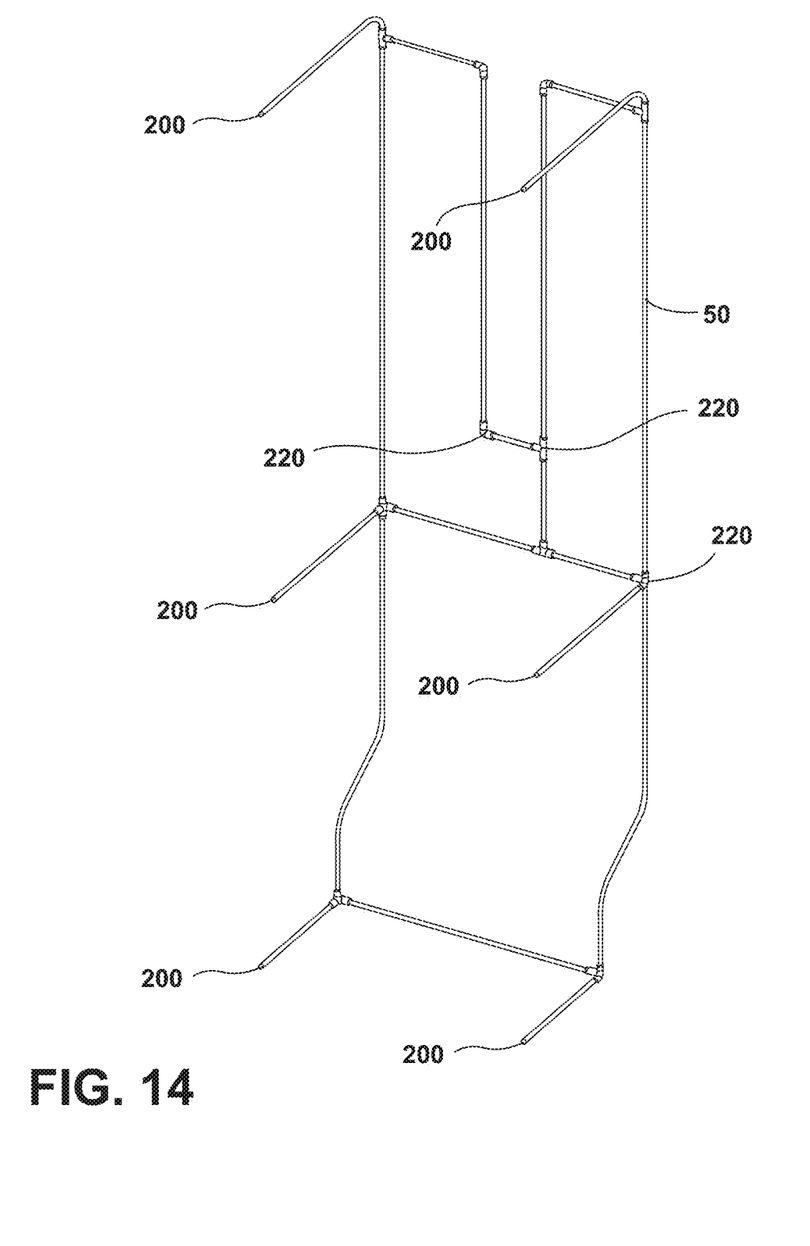
FIG. 14 is a side perspective view of the tubing of FIGS. 12 and 13.

As shown in FIGS. 12 and 13, the plurality of clips 40 may be positioned on one or more of the first side portion 210, the second side portion 212, and the base portion 216. The plurality of clips 40 may be integrally formed with fittings 220, as shown. Alternatively, the plurality of clips 40 may be spaced apart from the fittings 220. The fittings 220 may be configured to be corner fittings, tee fittings, or cross-fittings. In various examples, the fittings 220 may be configured to couple a plurality of pieces of tubing 50 together.

Referring again to FIGS. 12-14, the tubing 50 may include a plurality of terminal ends 200 extending along the first and second side portions 210, 212 of the rear panel 20. As discussed elsewhere herein with respect to the freezer door assembly 86 in FIG. 11, the terminal ends 200 may be coupled with caps 204. The terminal ends 200 may be positioned to facilitate even distribution of suction throughout the panel assembly 14 of the vacuum insulation assembly for the cabinet 70 of the appliance 60.

Referring again to FIGS. 1-15, a method 300 for assembling the vacuum insulation assembly 10 may be provided. The method 300 may include a step 304 of positioning the guide 130 flush with the inner surface 44 of the rear panel 20, as shown in FIG. 4. In various examples, the guide 130 may be positioned flush with the front panel 18. The guide 130 may be sized to be received by the selected panel 18, 20 where the edges of the guide 130 are substantially flush with the perimeter wall 100, 104 of the selected panel 18, 20. The guide 130 may define the plurality of spaces 134 oriented in the predetermined pattern to indicate the placement of the plurality of clips 40. The predetermined pattern may include the plurality of rows 150 and columns 152 to provide a serpentine pattern or other pattern configured to orient the tubing 50 to define multiple rows of tubing 50 (FIG. 9). The guide 130 may indicate the predetermined pattern for tubing 50 (FIG. 4).

Figure 15:
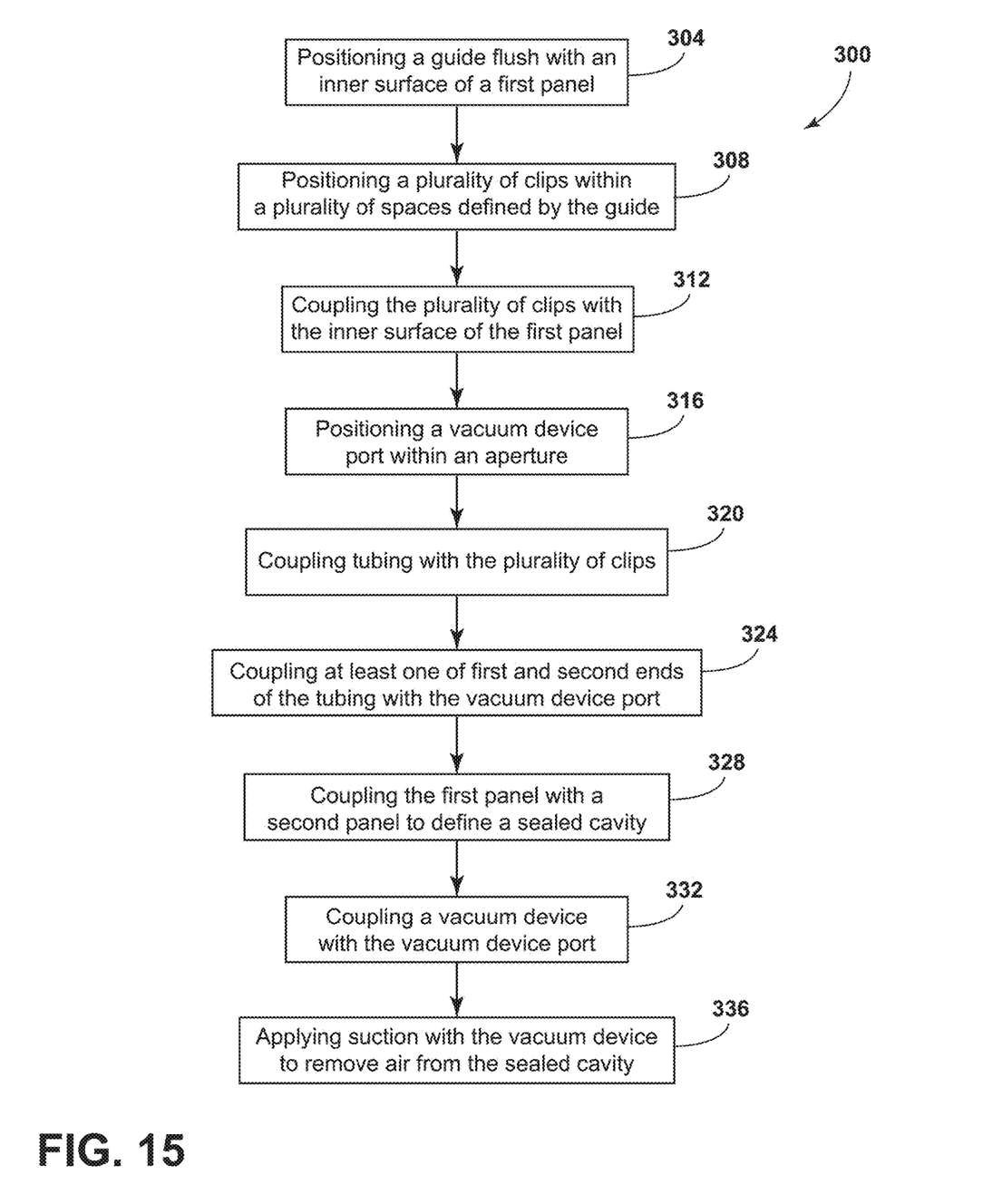
FIG. 15 is a flow diagram for a method for assembling a vacuum insulation assembly, according to various examples.

The method 300 may include a further step 308 of positioning the plurality of clips 40 within the plurality of spaces 134 defined by the guide 130. Alternatively, the guide 130 may be used to outline marks indicating the clips location. For example, paint may be used to indicate the location of the clips 40 so that, after the guide 130 is separated from the panel 20, the locations remain visible. The plurality of clips 40 may then be coupled with the panel 20 using the marks as a guide. Another step 312 may include coupling the plurality of clips 40 with the inner surface 44 of the rear panel 20. The plurality of clips 40 may be coupled with the inner surface 44 of the rear panel 20 using, for example, adhesive, welding, or fasteners. The guide 130 may be separated from the rear panel 20 in another step 316.

The method 300 may further include a step 316 of positioning the vacuum port 32 within the aperture 28 defined by the rear panel 20 may be included. In various examples, the guide 130 may define the opening 138 to guide installation of the vacuum port 32. In other examples, the vacuum port 32 may be positioned within the aperture 28 after the guide 130 is separated from the rear panel 20.

Another step 320 of the method 300 may include coupling the tubing 50 with the plurality of clips 40. The tubing 50 may be received by the channel 48 of each of the plurality of clips 40. The tubing 50 may be formed of porous material such that the tubing 50 is permeable. The method 300 may further include a step 324 of coupling the first and second ends 52, 54 of the permeable tubing 50 with the vacuum port 32. More specifically, the first and second ends 52, 54 may be coupled with the inlets 180 of the vacuum port 32.

The method 300 may include a step 328 of coupling the front panel 18 of the panel assembly 14 with the rear panel 20 to define the sealed cavity 24. The plurality of clips 40 and the tubing 50 may be positioned within the cavity 24. In various examples, the front panel 18 may be a panel of the door assembly 84, 86 or the cabinet 70 of the appliance 60. In other examples, the front panel 18 may be a separate panel where the panel assembly 14 is configured to fit within the door assembly 84, 86 or a wall of the cabinet 70.

Another step 332 of the method 300 may include coupling the vacuum device 36 with the vacuum port 32. The vacuum device 36 may be interchangeable with the port cover 190, as discussed elsewhere herein. When the vacuum device 36 is coupled with the outlet 188 of the vacuum port 32, the method 300 may include a step 336 of applying suction with the vacuum device 36 to remove air from the cavity 24. The vacuum device 36 and the tubing 50 may be used to define at least a partial vacuum within the sealed cavity 24. Suction may be applied by the vacuum device 36 until any air within the cavity 24 is evacuated through the tubing 50 and through the vacuum port 32 until the cavity 24 may be vacuum sealed and/or may define at least a partial vacuum. The pattern of the tubing 50 determined by the plurality of clips 40 allows air to be evacuated throughout the volume of the cavity 24, reducing the time needed to form sealing and increasing the efficiency of the process of vacuum sealing the vacuum insulation assembly 10.

According to one aspect, a vacuum insulation assembly may include a panel assembly having a front panel and a rear panel. The front panel and the rear panel may define a cavity. An aperture may be defined by the rear panel. A vacuum port may be positioned within the aperture and may be selectively engaged with a vacuum device. A plurality of clips may be operably coupled with an inner surface of the rear panel. Each of the plurality of clips may define a channel. Tubing may be positioned within the channel of each of the plurality of clips. The tubing may have a first end and a second end. The first end and second ends may be coupled with the vacuum port.

According to another aspect, the panel assembly may be integrally formed with a door of an appliance.

According to other aspects, the panel assembly may be integrally formed with a body of an appliance.

According to yet another aspect, the plurality of clips may be positioned on the inner surface of the rear panel in a predetermined pattern. The plurality of clips may extend into the cavity away from the inner surface. The predetermined pattern may orient the tubing in a serpentine pattern.

According to other aspects, the tubing may be permeable.

According to still other aspects, the vacuum port may be selectively engaged with a cover.

According to another aspect, a vacuum insulation assembly may include a front panel operably coupled with a rear panel. An aperture may be defined by one of the front panel and the rear panel. A vacuum port may be positioned within the aperture. A plurality of clips may be operably coupled with an inner surface of the rear panel. Tubing may be coupled with the plurality of clips. A first end and a second end of the tubing may be coupled with the vacuum port.

According to other aspects, the front panel and the rear panel may be coupled with a door of an appliance.

According to still another aspect, the vacuum insulation assembly may further include a liner positioned over the front panel and the rear panel.

According to yet another aspect, the door may be a freezer door, and further wherein the plurality of clips may be positioned along a perimeter of the rear panel.

According to still other aspects, the door may be a refrigerator compartment door. The plurality of clips may be positioned in a predetermined pattern.

According to another aspect, the predetermined pattern orients the tubing in a serpentine pattern.

According to still other aspects, the front panel and the rear panel may be coupled with a body of an appliance.

According to yet another aspect, the rear panel may include first and second side portions extending perpendicularly from a base portion. The plurality of clips may be positioned on the first and second side portions and the base portion.

According to other aspects, the tubing may include a plurality of terminal ends extending along the first and second side portions of the rear panel.

According to another aspect, each of the plurality of clips may define a channel. The channel may have a substantially circular cross-section.

According to still other aspects, the vacuum port may be selectively engaged with one of a vacuum device and a port cover.

According to yet another aspect, a method for assembling a vacuum insulation assembly may include a step of positioning a guide flush with an inner surface of a rear panel. The guide may define a plurality of spaces oriented in a predetermined pattern. The method may include a further step of coupling a plurality of clips with the inner surface of the rear panel. The plurality of clips may be positioned within the plurality of spaces of the guide. Another step of separating the guide from the rear panel may be included in the method. The method may also include a step of positioning a vacuum port within an aperture defined by the rear panel. Another step of the method may include coupling permeable tubing with the plurality of clips. The method may further include a step of coupling first and second ends of the permeable tubing with the vacuum port.

According to other aspects, the method for assembling a vacuum insulation assembly may include a step of coupling a front panel with the rear panel to define a sealed cavity with the plurality of clips and the tubing positioned within the cavity.

According to still another aspect, the method for assembling a vacuum insulation assembly may include a step of coupling a vacuum device with the vacuum port. The method for assembling a vacuum insulation assembly may further include a step of applying suction with the vacuum device to remove air from the cavity through the permeable tubing and through the vacuum port until the cavity may define at least a partial vacuum.

It will be understood by one having ordinary skill in the art that construction of the described disclosure and other components is not limited to any specific material. Other exemplary examples of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional central members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the appliance) such that the component may function in any manner described herein.

It is also important to note that the construction and arrangement of the elements of the disclosure as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vacuum insulation assembly, comprising:
   a panel assembly including a front panel and a rear panel, wherein the front panel and the rear panel define a cavity;
   an aperture defined by the rear panel;
   a vacuum port positioned within the aperture and selectively engaged with a vacuum device;
   a plurality of clips operably coupled with an inner surface of the rear panel, wherein each of the plurality of clips defines a channel; and
   tubing positioned within the channel of each of the plurality of clips, the tubing having a first end and a second end, wherein at least one of the first and second ends are coupled with the vacuum port.

2. The vacuum insulation assembly of claim 1, wherein the panel assembly is integrally formed with a door of an appliance.

3. The vacuum insulation assembly of claim 1, wherein the panel assembly is integrally formed with a body of an appliance.

4. The vacuum insulation assembly of claim 1, wherein the plurality of clips are positioned on the inner surface of the rear panel in a predetermined pattern, the plurality of clips extending into the cavity away from the inner surface, and further wherein the predetermined pattern orients the tubing in a serpentine pattern.

5. The vacuum insulation assembly of claim 1, wherein the tubing is permeable.

6. The vacuum insulation assembly of claim 1, wherein the vacuum port is selectively couplable with a cover.

7. A vacuum insulation assembly, comprising:
   a front panel operably coupled with a rear panel;
   an aperture defined by one of the front panel and the rear panel;
   a vacuum port positioned within the aperture;
   a plurality of clips operably coupled with an inner surface of the rear panel; and
   tubing coupled with the plurality of clips, wherein at least one of a first end and a second end of the tubing are coupled with the vacuum port.

8. The vacuum insulation assembly of claim 7, wherein the front panel and the rear panel are coupled with a door of an appliance.

9. The vacuum insulation assembly of claim 8, further comprising:
   a liner positioned over the front panel and the rear panel.

10. The vacuum insulation assembly of claim 8, wherein the door is a freezer door, and further wherein the plurality of clips are positioned along a perimeter of the rear panel.

11. The vacuum insulation assembly of claim 8, wherein the door is a refrigerator compartment door, and further wherein the plurality of clips are positioned in a predetermined pattern.

12. The vacuum insulation assembly of claim 11, wherein the predetermined pattern orients the tubing in a serpentine pattern.

13. The vacuum insulation assembly of claim 7, wherein the front panel and the rear panel are coupled with a body of an appliance.

14. The vacuum insulation assembly of claim 13, wherein the rear panel includes first and second side portions extending perpendicularly from a base portion, and further wherein the plurality of clips are positioned on the first and second side portions and the base portion.

15. The vacuum insulation assembly of claim 14, wherein the tubing includes a plurality of terminal ends extending along the first and second side portions of the rear panel.

16. The vacuum insulation assembly of claim 7, wherein each of the plurality of clips defines a channel, the channel having a substantially circular cross-section.

17. The vacuum insulation assembly of claim 7, wherein the vacuum port is selectively engaged with one of a vacuum device and a port cover.

* * * * *